April 28, 1931.  J. A. NOEL  1,802,444
ATTACHABLE GATE CLOSER
Filed March 14, 1929
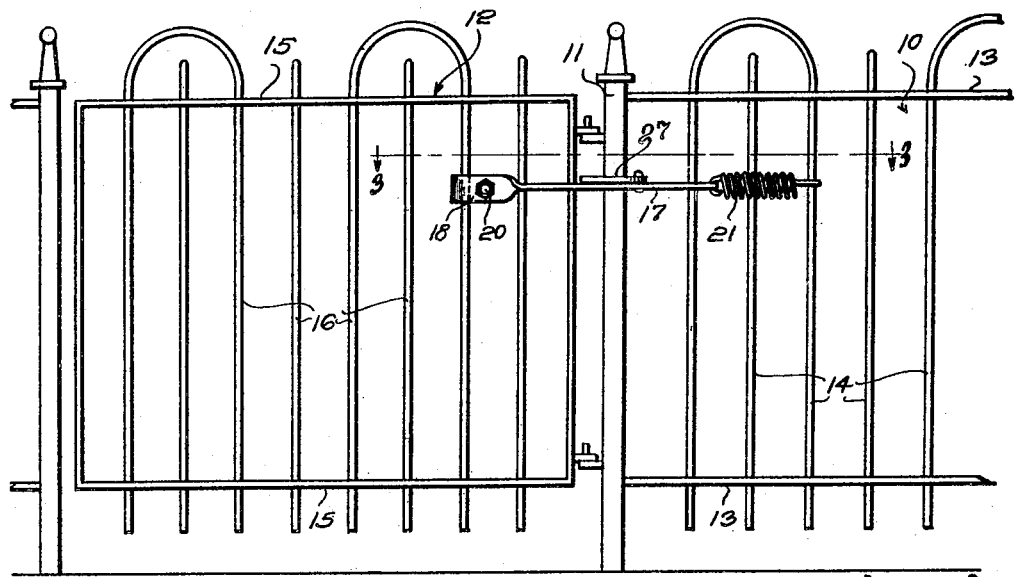
Fig. 1.
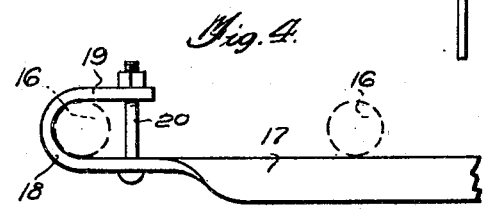
Fig. 4.
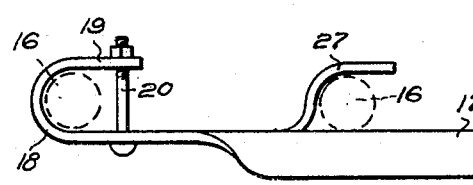
Fig. 5.
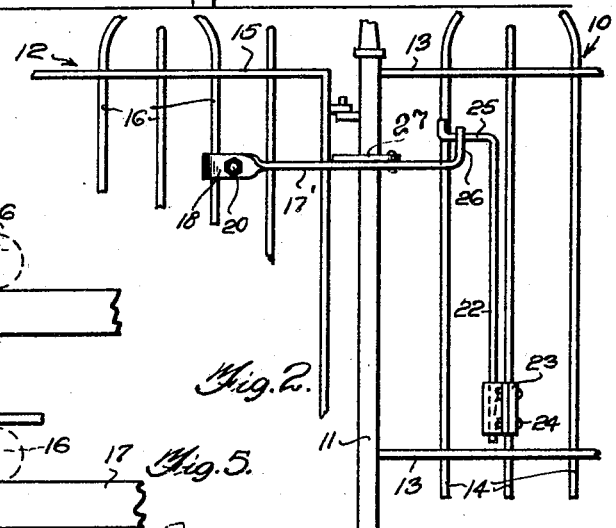
Fig. 2.
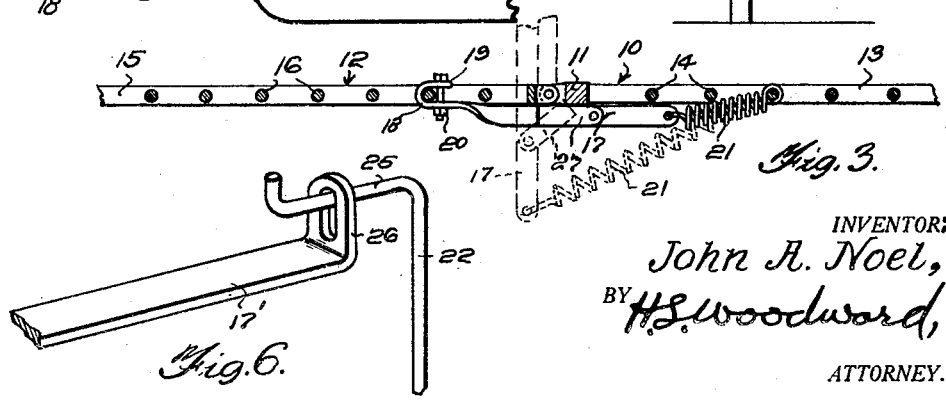
Fig. 3.
Fig. 6.
INVENTOR:
John A. Noel,
BY H. S. Woodward,
ATTORNEY.

Patented Apr. 28, 1931

1,802,444

UNITED STATES PATENT OFFICE

JOHN A. NOEL, OF WASHINGTON, DISTRICT OF COLUMBIA

ATTACHABLE GATE CLOSER

Application filed March 14, 1929. Serial No. 347,128.

The invention has for an object to present a simple attachable gate closing appliance especially useful on picket fence gates. It is a further aim to present this device in such form that it may be applied by inexperienced persons to gates of ordinary construction without requiring modification of the gate structure or machine work thereon. It is also a purpose to enable the construction of the device at a low cost and in a durable form, liable in a minimum degree to damage and wear incident to ordinary use. Another end in view is to present a device which will serve as a single member to effect closure of the gate and act as a stop by which closing movement of the gate will be checked.

Additional objects, advantages and features of invention reside in the construction, arrangement and combination of parts involved in the embodiment of the invention as may be understood from the following description and accompanying drawings, wherein Figure 1 is an elevational view of a gate upon which my invention is incorporated.

Figure 2 is a fragmentary elevation of a modification of the device showing a bar spring.

Figure 3 is a horizontal sectional view on the line 3—3 of Figure 1.

Figure 4 is a detail of the attaching member detached.

Figure 5 is a similar view of a modification of the attaching member.

Figure 6 is a perspective view of a bar and spring connection.

There is illustrated a portion of a fence 10 having a gate post 11, upon which is pivoted a gate 12 of a familiar construction. The fence includes upper and lower horizontal members 13 in which are mounted metal rod pickets 14. And the gate has corresponding upper and lower members 15 between which metal rod pickets 16 are fixed. A closure device is attached to the gate comprising a short bar of strap metal 17 having a hook 18 formed at one end, the extremity of the bill 19 of the hook being apertured as well as the body of the bar, both apertures in alinement. A bolt 20 is engaged through the apertures, having a nut thereon by which the bill 19 may be pressed toward the body of the bar. The hook is engaged with one of the pickets 16, and the nut tightened on the bolt so that the picket is clamped in the hook. The hook is preferably engaged with the second or third picket in the gate, counting from the post 11.

The bar 17 is of a length to project past the gate post 11 and across one or more of the pickets 14 of the fence. The extremity of the bar is apertured and has engaged therewith one end of a contractile coil spring 21 the opposite end of which is connected to one of the pickets of the fence under sufficient tension to draw the adjacent end of the bar 17 into engagement with the picket or pickets within its radius.

The bar 17 is located on the side of the gate and fence opposite that toward which the gate swings in opening. It will be seen that when the gate is opened the tension on the spring 21 is increased by the swinging of the bar 17 and that when the gate is freed the force applied to the extremity of the bar 17 by the spring will effect the closing of the gate.

In Figures 2 and 6 a bar or leaf spring 22 is utilized to close the gate, the lower end of the spring being provided with parallel clamping jaws 23 apertured at the ends and receiving thereacross a binding screw or bolt 24 by which they may be drawn together upon an interposed picket 14, as shown. The upper end of the spring is bent horizontally toward the gate post 11, and formed with an arm 25 received loosely for swivelling in the upturned and apertured ends 26 of the bar 17' which may otherwise correspond to the bar 17 first described. The last described construction is preferable because of the fact that the bar spring is less liable to damage by mischievous persons than the helical spring.

In the operation of the last described form of the device when the gate is opened, the end 26 of the bar 17' will be swung outwardly, flexing the spring 22 laterally from the fence, at first, and then, under continued movement of the gate, toward the post 11. The tension on the spring the while will tend at all times to return the gate to closed position.

In either form of construction when the gate has been moved fully to closed position the engagement of the bar 17 or 17' against the pickets of the fence will check the closing movement of the gate.

The bar 17 or 17' is preferably twisted a quarter turn immediately inward of the hook 18 so as to present it in a plane at right angles to the plane of the gate and fence, whereby it will most efficiently resist bending stress.

Pivoted on the bar 17 there is a check arm 27, having is pivot located between the pivot of the gate and the extremity of the bar, so that the pivot of the bar 27 swings away from the fence in opening movement of the gate. The arm is of such length that when the gate is opened the arm may be swung toward the fence and its end adjusted against the post 11 so as to prop the gate open, the device thus serving the further function of a gate holder. The bar 17' may be similarly equipped with the device 27.

I claim:

1. An attachable gate closer comprising a bar having a picket-clamping device thereon whereby to hold the bar against one side of a gate, said bar having an end arranged to project beyond the pivot axis of an attached gate and having at said projected extremity an upturned stud, a spring comprising an elongated flexible bar having a fence-picket-clamping device at its lower end, and having a lateral extension at its upper end engaging slidably and pivotally said stud.

2. An attachable gate closer comprising a bar, having a picket-embracing member, means to clamp a picket therein, said bar being arranged to be supported upon and across a plurality of pickets of the gate and at least one picket of the fence by said picket-embracing member, and a leaf spring having a slidable and pivotal connection with the extremity of said bar at its upper end and having a picket-embracing clamp at its lower end attachable to a fence picket and adapted to bear the bar toward the fence.

3. An attachable gate closer comprising a bar having a picket-embracing member, means to clamp a picket therein, said bar being arranged to be supported upon and across a plurality of pickets of the gate and at least one picket of the fence by said picket embracing member, a leaf spring connected to the extremity of the bar and attachable to a fence picket, and a stop arm pivoted on the bar at a point which swings toward and away from the fence under operation of the gate, said arm being movable and constructed for engagement at its extremity with a part of the fence to hold the gate releasably in open position.

In testimony whereof I affix my signature.

JOHN A. NOEL.